(12) United States Patent
Brys et al.

(10) Patent No.: US 6,251,539 B1
(45) Date of Patent: Jun. 26, 2001

(54) ALKALINE CELL WITH IMPROVED ANODE

(75) Inventors: Barbara Brys, Bedford; Peter B. Harris, Stow, both of MA (US)

(73) Assignee: The Gillette Company, Boston, MA (US)

(\*) Notice: Subject to any disclaimer, the term of this patent is extended or adjusted under 35 U.S.C. 154(b) by 0 days.

(21) Appl. No.: 09/332,964

(22) Filed: Jun. 14, 1999

(51) Int. Cl.[7] .............. H01M 4/42; H01M 4/58; H01M 6/04; H01M 10/26; H01M 4/50
(52) U.S. Cl. .............. 429/229; 429/206; 429/224; 429/226; 429/232
(58) Field of Search .................. 429/206, 224, 429/229, 226, 232

(56) References Cited

U.S. PATENT DOCUMENTS

| | | | |
|---|---|---|---|
| 4,968,569 | \* | 11/1990 | Chiba et al. .................. 429/229 |
| 5,240,793 | | 8/1993 | Glaeser .................. 429/206 |
| 5,464,709 | \* | 11/1995 | Getz et al. .................. 429/229 |
| 5,607,796 | \* | 3/1997 | Jacus et al. .................. 429/165 |
| 5,639,578 | \* | 6/1997 | Urry .................. 429/229 |
| 5,800,939 | \* | 9/1998 | Mishina et al. .................. 429/57 |

FOREIGN PATENT DOCUMENTS 61-2270    1/1986   (JP) .

\* cited by examiner

Primary Examiner—Wayne Langel
Assistant Examiner—Jonas N. Strickland
(74) Attorney, Agent, or Firm—Barry D. Josephs; Paul I. Douglas; Thomas G. Krivulka

(57) ABSTRACT

The performance of alkaline cells comprising a zinc anode and manganese dioxide cathode can be improved, especially in high power application, by the addition of electrically conductive powders such as tin, copper, silver, magnesium, indium or bismuth to the anode mixture. The conductive powders are in physical mixture with the zinc particles. A preferred electrically conductive powder is tin powder. The alkaline cell to which the conductive powders are added preferably contain no added mercury and preferably are also essentially free of lead.

4 Claims, 1 Drawing Sheet

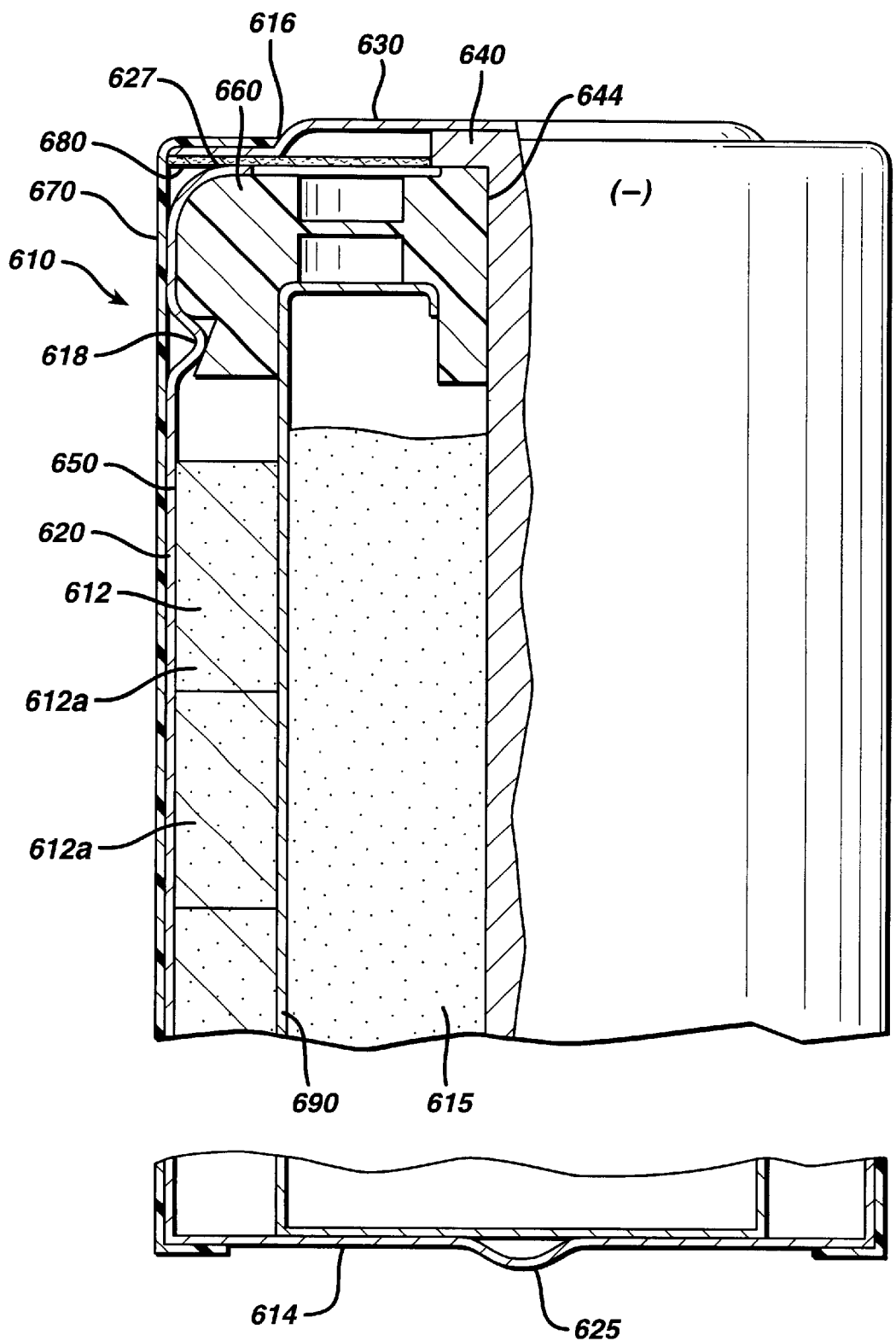

ALKALINE CELL WITH IMPROVED ANODE

FIELD OF THE INVENTION

The invention relates to alkaline cells having a cathode comprising manganese dioxide. The invention relates particularly to an alkaline cell having an anode comprising zinc, a cathode comprising manganese dioxide, and an electrolyte comprising potassium hydroxide wherein the anode includes electrically conductive additives such as metallic powders, particularly tin powder.

BACKGROUND

The cell contents of a primary alkaline cell typically contain an anode comprising zinc anode active material, alkaline electrolyte, a cathode comprising manganese dioxide cathode active material, and an electrolyte ion permeable separator, typically comprising a nonwoven material containing cellulosic fibers and polyvinylalcohol fibers. The anode active material comprises zinc particles admixed with zinc oxide and conventional gelling agents, such as carboxymethylcellulose or acrylic acid copolymers, and electrolyte. The gelling agent holds the zinc particles in place and in contact with each other. A conductive metal nail, known as the anode current collector, is typically inserted into the anode material in contact with the end cap which forms the cell's negative terminal. The alkaline electrolyte is typically an aqueous solution of potassium hydroxide, but other alkali solutions of sodium or lithium hydroxide may also be employed. The cathode material is typically of manganese dioxide and may include small amounts of carbon or graphite to increase conductivity. Conventional alkaline cells have solid cathodes comprising battery grade particulate manganese dioxide. Battery grade manganese dioxide as used herein refers to manganese dioxide generally having a purity of at least about 91 percent by weight. Electrolytic $MnO_2$ (EMD) is the preferred form of manganese dioxide for alkaline cells because of its high density and since it is conveniently obtained at high purity by electrolytic methods. EMD is typically manufactured from direct electrolysis of a bath of manganese sulfate and sulfuric acid.

In the cathodes of conventional $Zn/MnO_2$ alkaline cells the manganese dioxide composition is typically between about 70 and 87 percent by weight. Particulate graphite and aqueous KOH solution (7–11 Normal) can be added to the manganese dioxide to form a cathode mixture. Such mixtures form a moist solid mix which can be fully compacted into the cell casing using plungers or other such compacting devices forming a compacted solid cathode mass in contact with the cell casing. The cathode material can be preformed into the shape of disks forming annular rings inserted into the cell in stacked arrangement, for example, as shown in U.S. Pat. No. 5,283,139, and then recompacted.

Since commercial cell sizes are fixed, it has been desirable to attempt to increase the capacity, i.e., the useful service life of the cell, by increasing the surface area of the electrode active material and by packing greater amounts of the active material into the cell. This approach has practical limitations. If the active material is packed too densely into the cell, this can reduce the rate of electrochemical reaction during discharge, in turn reducing service life. Other deleterious effects such as polarization can occur, particularly at high current drain (high power applications). Polarization limits the mobility of ions within the electrode active material and within the electrolyte, which in turn reduces service life. The contact resistance between the $MnO_2$ cathode active material and the cell casing of an alkaline cell also reduces service life. Such contact resistance losses typically increases, particularly as the cell is discharged during high power applications (between about 0.5 and 1 watt).

There are increasing commercial demands to make primary alkaline cells better suitable for high power application. Modern electronic devices such as cellular phones, digital cameras and toys, flash units, remote control toys, camcorders and high intensity lamps are examples of such high power applications. Such devices require high current drain rates, typically pulsed drain, of between about 0.5 and 2 Amp, more usually between about 0.5 and 1.5 Amp. Correspondingly, they require operation at power demands between about 0.5 and 2 Watt. Modern electronic devices such as cellular phones, digital cameras and toys, flash units, remote control toys, camcorders and high intensity lamps are examples of such high power applications. Thus, it is desirable to provide a way of reliably increasing the useful service life of conventional primary alkaline cells particularly for cells to be used in high power applications, without significantly increasing polarization effects or otherwise adversely affecting cell performance.

U.S. Pat. No. 5,240,793 discloses an alkaline cell wherein the zinc in the anode is alloyed with indium and bismuth. The zinc may also be alloyed with indium, bismuth and barium. The cell is substantially free of mercury and has a lead content of less than 30 ppm.

Japanese patent publication Hei 61–2270 discloses the addition of metal powders to the anode of alkaline cells having an anode comprising zinc and a cathode comprising silver oxide ($Zn/Ag_2O$ cell). The metal powders have an average particle size between about 0.01 and 5 micron. The types of metal powders disclosed are copper, silver, gold, tin and lead. The zinc is amalgamated with mercury. The metal powders are amalgamated with mercury and can also be treated with anticorrosive agents before being added to the anode. The $Zn/Ag_2O$ cell is chemically very different from the $Zn/MnO_2$ cell and has different discharge characteristics. For example, the $Zn/Ag_2O$ cell does not consume water during discharge, has a flat voltage discharge profile and characteristically higher bulk density of zinc (lower electrolyte loading) in the anode than the $Zn/MnO_2$ cell.

BRIEF DESCRIPTION OF THE DRAWINGS

The FIGURE is a cross-sectional cut away view of an alkaline cell having an anode of the invention.

SUMMARY OF THE INVENTION

Applicant has determined that the suitability of modern alkaline cells for high power application is markedly improved when electrically conductive powders are added to the anode material. The performance is improved even if the electrolyte loading (zinc bulk density) in the anode is varied. Thus, the performance of zinc/$MnO_2$ alkaline cells through a range in zinc bulk density in the anode (more of less electrolyte loading in the anode) can be improved, especially under high power application when electrically conductive powders are added to the anode. Thus, the present invention is applicable to zinc/$MnO_2$ alkaline cells where the bulk density of the zinc in the anode is between about 1.75 and 2.2 $g/cm^3$, preferably between about 1.8 and 2.1 $g/cm^3$. The percent by volume of the aqueous electrolyte solution in the anode is between about 69.2 and 75.5 percent by volume of the anode.

Suitable electrically conductive powders are desirably metal powders such as tin, copper, silver, magnesium, indium, bismuth and mixtures thereof. The metal powders are added in physical mixture with the zinc particles, that is, are not alloyed to the zinc particles. The metal powder is desirably added to the cell's anode in amount comprising between about 0.2 and 3.0 percent by weight of the total anode, preferably between about 0.2 and 2.0 percent by weight, more preferably between about 0.5 and 2.0 percent by weight of the total anode. The average particle of the metal powder additive desirably has a surface area between about 0.1 and 10 $mm^2$, preferably between about 0.5 and 1.5 $mm^2$. The average particle of the metal powder desirably has a thickness between about 10 and 50 micron, preferably between about 10 and 25 micron.

Of the metal powders listed above, tin has been determined to be the more preferable powder additive. The tin powder is added in physical mixture with the anode materials. Although the cell's performance can be improved, especially under high power application, with addition of the conductive metal powders above listed, the addition of tin powder has been determined to especially desirable because it cuases less gassing than the other metal additives, for example, copper. Surprisingly, tin powder, when used as anode additive has the ability to improve the cell's performance under high power discharge without increasing gassing within the cell to a level that noticeably interferes with the cell's overall utility and service life.

The zinc/$MnO_2$ alkaline cell of the invention is essentially mercury free, that is, does not contain any added mercury. Therefore, the cell of the invention has a total mercury content less than about 50 parts per million parts of total cell weight, preferably less than 20 parts per million of total cell weight, more preferably less than about 10 parts per million of total cell weight. The cell of the invention also preferably does not contain added amounts of lead and thus is essentially lead free, that is, the total lead content is less than 30 ppm, desirably less than 15 ppm of the total metal content of the anode. Despite the fact that the cell is essentially free of mercury and lead, the addition of tin powder to the anode material does not increase gassing to a level that interferes with the cell's overall performance when the cell is discharged at high rate (0.5 to 2 Amp). Rather, the addition of tin powder to the anode of a zinc/MnO2 alkaline cell enhances performance under high rate discharge.

This runs contrary to expectation, since the addition of metallic particles to the anode in the absence of unamalgamated zinc (no added mercury) and in the absence of added lead, would be thought to promote significant gassing noticeably reducing the cell's service life and overall performance, since the added metallic particles provide sites for secondary reactions to occur. Applicant has determined that this does not occur if the metallic particles are of specific size, preferably having an average surface area between about 0.1 and 10 $mm^2$ and small concentration, for example, between about 0.2 and 3.0 percent by weight of the anode. The metal powders, preferably tin powder having an average particle surface area between about 0.1 and 10 $mm^2$, preferably between about 0.5 and 1.5 $mm^2$ and average particle thickness between about 1 and 50 micron, preferably between about size between about 10 and 25 micron, and a concentration of between about 0.2 and 2.0 percent by weight of the anode improves cell performance under high power application. It is theorized that the electrically conductive powders, particularly tin powder provides conductive pathways between isolated zinc particles or zinc particle aggregates within the anode mixture. This reduces the rate of increase of cell's internal resistance upon discharge at high power, surprisingly without increasing gassing to a level that adversely interferes with the cell's overall performance. This in turn prevents the voltage from dropping drastically even when the cell is drained at high rate, e.g. between about 0.5 and 1.5 Amp or between about 0.5 and 2 Watt. The net effect is improved cell performance at high rate discharge as measured by increased service life and total energy output.

DETAILED DESCRIPTION

A representative primary zinc/manganese dioxide alkaline AA cell can be prepared with particulate manganese dioxide. The AA cell is prepared with a cell casing formed of steel which is plated on the inside and outside surface with nickel. The inside surface of the casing can be coated with a conductive material for example, with carbon, but the casing used in the examples herein did not have any coating. Conventional cathode and anode mixtures, electrolyte and separator membrane are employed, except that electrically conductive powders, preferably tin powder is added to the anode material in accordance with the invention. The anode material can be in the form of a gelled mixture containing mercury free (zero-added mercury) zinc alloy powder. Such mixture may typically contain aqueous KOH electrolyte solution, gelling agent, e.g. acrylic acid copolymer such as CARBOPOL C940 from B.F. Goodrich; and surfactants e.g. organic phosphate ester surfactant GAFAC RA600 from Rhone Poulenc. Such mixture is given as illustrative and not intended to restrict the invention. Other representative gelling agents for zinc anodes are disclosed in U.S. Pat. No. 4,563,404. Other organic additives which can be added to zinc slurries are disclosed in European Patent Publication 0474382A1. The separator membrane can be a conventional ion permeable membrane of nonwoven material comprising polyvinylalcohol and cellulosic (rayon) fibrous material. The electrolyte is an aqueous solution of KOH containing about 7–11 Normal KOH and 2 wt % ZnO, hereinafter referred to as "aqueous KOH solution".

The cathode in the cell desirably has the following composition:

Electrolytic manganese dioxide (80–87 wt %), graphite (7–10 wt %), and a 7–10 Normal ("aqueous KOH solution between about 30–40 wt. KOH concentration") (5–7 wt %); polyethylene binder (0.1 to 0.5 wt %). Such cathode mixtures are intended to be illustrative and non intended to restrict the invention.

The anode material in each case comprises: Zinc alloy powder 62 to 69 wt % (99.9 wt % zinc containing indium), aqueous KOH solution comprising (38 wt % KOH and about 2 wt % ZnO); CARBOPOL C940 (B.F. Goodrich) cross linked acrylic acid polymer gelling agent (between 0.5 and 2 wt %) and Waterlock A-221 (Grain Processing Co.) hydrolyzed polyacrylonitrile grafted unto starch backbone (between 0.01 and 0.5 wt. %; RM-510 (Rhone-Pulenc) dionyl phenol phosphate ester surfactant (50 ppm). The zinc alloy average particle size is desirably between about 30 and 350 micron. The bulk density of the zinc in the anode (anode porosity) is between about 1.75 and 2.2 grams zinc per cubic centimeter of anode. The percent by volume of the aqueous electrolyte solution in the anode is between about 69.2 and 75.5 percent by volume of the anode.

The separator in each case was a conventional ion porous separator comprising an inner layer of nonwoven material of cellulosic (rayon) and polyvinylalcohol fibers and outer layer of cellophane. Such material is illustrative and not intended to restrict the invention. The cells tested were balanced in conventional manner so that the mAmp-hr capacity of $MnO_2$ (based on 370 mAmp-hr per gram $MnO_2$)

divided by the mAmp-hr capacity of zinc alloy (based on 822 mAmp-hr per gram zinc alloy) is about 1.

A representative alkaline cell configuration is shown in FIG. 1. The alkaline cell 610 comprises a cylindrical steel casing 620, having a closed end 614 and an open end 616. The cell is filled with cathode 612 comprising $MnO_2$, and an anode 615 comprising zinc and electrolyte. The electrolyte comprises a conventional mixture of KOH, ZnO and gelling agent. The cathode 612 can be supplied in the form of a series of compacted annular blocks 612a. The anode and cathode can be separated by a conventional ion porous separator 690, for example, comprising polyvinylalcohol and cellulosic fibrous material. After cell 610 is filled an insulating plug 660 is inserted into open end 616. Insulating plug 660 may be of polypropylene, talc filled polypropylene, sulfonated polyethylene or nylon. The plug 660 is preferably snap fitted around circumferential step 618 as shown in FIG. 1 so that the plug locks in place into the open end 616. The peripheral edge 627 of casing 620 is crimped over the top of insulating plug 660. A paper insulating washer 680 is applied over the crimped peripheral edge 627 of casing 620. Insulating washer 680 can be a polyethylene coated paper washer. A terminal end cap 630 is welded to the head of current collector 640. An elongated current collector 640 is then inserted (force fitted) into aperture 644 of insulating plug 660 so that end cap 630 comes to rest against insulating washer 680. Current collector 640 can be selected from a variety of known electrically conductive metals found to be useful as current collector materials, for example, brass, tin plated brass, bronze, copper or indium plated brass. The current collector 640 used in the test cells was of brass. Conventional asphalt sealant may be preapplied around the current collector 640 before it is inserted into aperture 644. A film label 670 is applied around casing 620. The terminal end cap 630 becomes the negative terminal of alkaline cell 610 and pip 625 at the closed end of casing 520 becomes the positive terminal.

The cell 610 shown in the FIGURE can be an AA cell. However, the alkaline cell shown in FIG. 1 is not intended to be restricted to any particular size. Thus, the present invention is applicable to AAAA, AAA, C and D size cylindrical alkaline cells as well as button size alkaline cells of any size or shape. Alkaline cell 610 is not intended to be restricted to any particular cell chemistry or cell size, except that conductive powders are added to the anode in accordance with the invention. Thus cell 610 can contain conventional alkaline cell chemistries including those which contain zero added mercury (less than 50 parts mercury per million parts total cell weight, preferably less than 10 parts mercury per million parts total cell weight) and modifications thereof. Such representative chemistries, for example , are disclosed in U.S. Pat. No. 5,401,590, herein incorporated by reference, except that electrically conductive particles, are desirably added to the anode in accordance with the invention. The cell 610 of the invention also preferably does not contain added amounts of lead and thus can be essentially lead free, that is, the total lead content is less than 30 ppm, desirably less than 15 ppm of total metal content of the anode. Also, although the invention is principally directed to primary alkaline cells the anode and cathode chemistries can be adjusted so that the cells become secondary (rechargeable) cells as is known in the art, except that electrically conductive particles, preferably tin particles are desirably added to the anode.

The above cell (the FIGURE) can be an AA cell prepared and used as test cells. The test cells were made as above described but with anode composition as given in the following examples. The cathode composition and cell components in each case were the same as above described. The following specific cathode composition was used in the following examples: MnO2—86.5 wt %; graphite 6.3 wt. percent; aqueous KOH solution (38 wt. % KOH) 6.9 wt % and polyethylene binder 0.3 wt %. Example 1 shows a comparative example wherein the anode composition does not contain any free metal powder additive. Example 2 is the same anode composition and same cell as in Example 1, but with addition of 1 weight percent tin powder to the anode. Similarly, Example 3 shows a comparative example wherein the anode composition does not contain any free metal powder additive. Example 4 is the same anode composition and same cell as in Example 3 but with addition of 1 weight percent tin powder to the anode. The tin powder added to the anode (Example 2 and 4) desirably has a preferred average particle thickness between about 10 and 25 micron and average particle surface area between about 0.1 and 1.5 $mm^2$, preferably between about 0.5 and 1.5 $mm^2$.

The invention is not intended to be restricted to any particular particle shape but average tin particle shape which are approximately rectangular are desirable. Such approximately rectangular particle shape typically has an average length which is between about 1 and 3 times the length. The average tin particle surface may be convoluted. Tin powder having such characteristics is commercially available from the Transmet Corp. under the trade designation K-502 and K-508 tin powder. The K-502 powder has an average particle thickness between about 10 and 25 micron and average surface area of 1 $mm^2$. The K-508 powder has an average particle thickness between about 10 and 25 micron and average surface area of 0.6 $mm^2$. The particles are generally of approximately rectangular shape as above described and the average particle has a convoluted surface. It is possible that the convoluted surface of these particles can be a contributing factor to the distinct performance improvements obtained when the tin powder is added to alkaline cell anodes.

The cells were discharged at a high power 1 Watt continuous drain to 1.0 volts cutoff. The cells were discharged at intermittent drain and at pulsed high power output to simulate usage in photo cameras. The cell's performance was measured and compared to that of a comparative cell with no tin powder added.

The cell's service hours and energy output (Watt-hr) are reported.

EXAMPLE 1

(Comparative)

| Anode (AA Cell)[1] | Wt, g | Vol., cm$^3$ | Wt. % Anode | Vol. % Anode |
|---|---|---|---|---|
| Total Anode | 5.83 | 1.90 | | |
| Total zinc, | 3.91 | 0.548 | 67 | 28.8 |
| KOH electrolyte in anode (electrolyte conc. 35–40 wt % KOH, 2 wt % ZnO) | 1.92 | 1.35 | 33 | 71.2 |
| KOH pure (without water) | 0.72 | | | |
| Tin powder, | None | | | |

Notes:
[1]Bulk density zinc in anode is 2.063 grams zinc per cm$^3$ anode. Zinc real density is 7.14 g/cm$^3$. Anode diameter is at 8.95 mm. Cathode wall thickness as measured along a line perpendicular to the cell's longitudinal axis is 2.35 mm. Anode theoretical capacity was 3.20 Amp-Hrs.

The cell in the above example was discharged to 1.0 volts at continuous power drain of 1 Watt. Under such discharge conditions the cell had 0.584 service hours; and the energy output of the cell was 0.584 watt-hrs.

The cell was discharged at a pulsed rate of 1.1 Amp for 10 seconds per minute for 1 hour per day to a cut-off voltage of 1.0 volt to simulate usage in photo cameras. The number of pulses achieved was 153. The energy output was 0.56 Watt-hrs. The cell was discharged at a pulsed rate of 1.1 Amp for 10 seconds per minute for 1 hour per day to a cut-off voltage of 0.8 volt to simulate usage in photo cameras. The number of pulses achieved was 380. The energy output was 1.222 Watt-hrs.

The cell was discharged continuously with alternating pulsed power drains at 1 Watt for 3 seconds and 0.1 Watt for 7 seconds. Under such discharge conditions the cell achieved 1.751 service hours (energy output 0.649 Watt-hrs) to a cutoff voltage of 1.0 volt and 3.546 service hours (energy output 1.312 Watt-hrs) to a cutoff voltage of 0.8 volts. The cell was discharged intermittently at 0.5 Watt for 15 minutes per hour to a cutoff voltage of 1.1 volt. Under such discharge conditions the cell achieved 1.6 service hours and energy output of 0.8 watt-hrs.

EXAMPLE 2

| Anode (AA Cell)[1] | Wt., g | Vol., cm$^3$ | Wt. % Anode | Vol. % Anode |
|---|---|---|---|---|
| Total Anode | 5.83 | 1.90 | | |
| Total zinc | 3.91 | 0.548 | 67 | 28.8 |
| KOH electrolyte in anode (electrolyte conc. 35–40 wt % KOH, 2 wt % ZnO) | 1.87 | 1.35 | 32 | 71.2 |
| KOH pure (without water) | 0.71 | | | |
| Tin powder, K-508 (avg. particle surface 0.6 mm$^2$; thickness 10–25 micron) | | | | 1.0 |

Notes:
[1]Bulk density zinc in anode is 2.063 grams zinc per cm$^3$ anode. Anode diameter is 8.95 mm. Zinc real density is 7.14 g/cm$^3$. Cathode wall thickness as measured along a line perpendicular to the cell's longitudinal axis is 2.35 mm. The anode theoretical capacity was 3.20 Amp-hrs.

The cell in the above example was discharged to 1.0 volts at continuous power drain of 1 Watt. Under such discharge conditions the cell had 0.638 service hours; and the energy output of the cell was 0.638 watt-hrs.

The cell was discharged at a pulsed rate of 1.1 Amp for 10 seconds per minute for 1 hour per day to a cut-off voltage of 1.0 volt to simulate usage in photo cameras. The number of pulses achieved was 208. The energy output was 0.578 Watt-hrs. The cell was discharged at a pulsed rate of 1.1 Amp for 10 seconds per minute for 1 hour per day to a cut-off voltage of 0.8 volt to simulate usage in photo cameras. The number of pulses achieved was 403. The energy output was 1.342 Watt-hrs.

The cell was discharged continuously with alternating pulsed power drains at 1 Watt for 3 seconds and 0.1 Watt for 7 seconds. Under such discharge conditions the cell achieved 2.102 service hours (energy output 0.778 Watt-hrs) to a cutoff voltage of 1.0 volt and 3.587 service hours (energy output 1.328 Watt-hrs) to a cutoff voltage of 0.8 volts. The cell was discharged intermittently at 0.5 Watt for 15 minutes per hour to a cutoff voltage of 1.1 volt. Under such discharge conditions the cell achieved 1.854 service hours and 0.927 Watt-hrs.

EXAMPLE 3

(Comparative)

| Anode (AA Cell)[1] | Wt., g | Vol., cm$^3$ | Wt. % Anode | Vol. % Anode |
|---|---|---|---|---|
| Total Anode | 5.87 | 2.04 | | |
| Total zinc | 3.70 | 0.518 | 63 | 25.4 |
| KOH electrolyte in anode (electrolyte conc. 35–40 wt % KOH, 2 wt % ZnO) | 2.17 | 1.52 | 37 | 74.6 |
| KOH pure (without water) | 0.82 | | 14 | |
| Tin powder | None | | | |

Notes:
[1]Bulk density zinc in anode (anode porosity) is 1.81 grams zinc per cm$^3$ anode. Zinc real density is 7.14 g/cm$^3$. Anode diameter at 9.22 mm. Cathode wall thickness as measured along a line perpendicular to the cell's longitudinal axis is 2.22 mm. The anode theoretical capacity was 3.03 Amp-hrs.

The cell in the above example was discharged to 1.0 volts at continuous power drain of 1 Watt. Under such discharge conditions the cell has 0.542 service hours; and the energy output of the cell was 0.542 watt-hrs.

The cell was discharged at a pulsed rate of 1.1 Amp for 10 seconds per minute for 1 hour per day to a cutoff voltage of 1.0 volt to simulate usage in photo cameras. The number of pulses achieved was 115. The energy output was 0.423 Watt-hrs. The cell was discharged at a pulsed rate of 1.1 Amp for 10 seconds per minute for 1 hour per day to a cut-off voltage of 0.8 volt to simulate usage in photo cameras. The number of pulses achieved was 297. The energy output was 0.834 Watt-hrs.

The cell was discharged continuously with alternating pulsed power drains at 1 Watt for 3 seconds and 0.1 Watt for 7 seconds. Under such discharge conditions the cell achieved 1.422 service hours (energy output of 0.527 Watt-hrs) to a cutoff voltage of 1.0 volt and 2.124 service hours (energy output of 0.786 Watt-hrs) to a cutoff voltage of 0.8 volts. The cell was discharged intermittently at 0.5 Watt for 15 minutes per hour to a cutoff voltage of 1.1 volt. Under such discharge conditions the cell achieved 1.348 service hours and an energy output of 0.591 Watt-hrs.

EXAMPLE 4

| Anode (AA Cell)[1] | Wt., g | Vol., cm$^3$ | Wt. % Anode | Vol. % Anode |
|---|---|---|---|---|
| Total Anode | 5.87 | 2.04 | | |
| Total zinc | 3.70 | 0.518 | 63 | 25.4 |
| KOH electrolyte in anode (electrolyte conc. 35–40 wt % KOH, 2 wt % ZnO) | 2.11 | 1.52 | 36 | 74.6 |
| KOH pure (without water) | 0.80 | | 14 | |
| Tin powder, K-508 (avg. particle surface 0.6 mm$^2$; thickness 10–25 micron) | | | | 1.0 |

Notes:
[1]Bulk density zinc in anode is 1.81 grams zinc per cm$^3$ anode. Zinc real density is 7.14 g/cm$^3$. Anode diameter at 9.22 mm. Cathode wall thickness as measured along a line perpendicular to the cell's longitudinal axis is 2.22 mm.

The cell in the above example was discharged to 1.0 volts at continuous power drain of 1 Watt. Under such discharge conditions the cell had a service life of 0.584 hours; and the energy output of the cell was 0.584 watt-hrs.

The cell was discharged at a pulsed rate of 1.1 Amp for 10 seconds per minute for 1 hour per day to a cut-off voltage of 1.0 volt to simulate usage in photo cameras. The number of pulses achieved was 200 (energy output of 0.731 Watt-hrs). The cell was discharged at a pulsed rate of 1.1 Amp for 10 seconds per minute for 1 hour per day to a cut-off voltage of 0.8 volt to simulate usage in photo cameras. The number of pulses achieved was 351 and the energy output was 1.177 watt-hrs.

The cell was discharged continuously with alternating pulsed power drains at 1 Watt for 3 seconds and 0.1 Watt for 7 seconds. Under such discharge conditions the cell achieved 1.781 service hours (energy output of 0.659 Watt-hrs) to a cutoff voltage of 1.0 volt and 3.196 service hours (energy output of 1.183 Watt-hrs) to a cutoff voltage of 0.8 volts. The cell was discharged intermittently at 0.5 Watt for 15 minutes per hour to a cutoff voltage of 1.1 volt. Under such discharge conditions the cell achieved 1.797 service hours and energy output of 0.899 Watt-hrs.

As may be seen from the performance results reported in Examples 2, the addition of about 1 weight percent tin powder to the anode composition improves the cell's performance in all the high power continuous, intermittent and pulsed tests which were undertaken compared to the performance of comparative cell (Example 1) without tin additive. Similarly, as may be seen from inspection of the performance results reported in Examples 4, the addition of about 1 weight percent tin powder to the anode composition (Example 4) improves the cell's performance in all the high power continuous, intermittent and pulsed tests which were undertaken compared to the performance of comparative cell (Example 3) without tin additive.

Zn/$MnO_2$ alkaline cells with anode composition having higher zinc bulk density (higher theoretical capacity) as in Example 1 can be desirable, since the cell can give longer service life especially under moderate and low drain application as well as for a number of high power applications. It has been determined that the addition of small amount of tin powder to anode composition of such cells can make such cells even more suitable for high power application as well. This is demonstrated by inspection of the Example 2 data which illustrates that addition of small amount of tin powder to the anode composition gives such cells much better performance under all of the reported high power tests than the same cell without the tin additive (Example 1).

For some high power applications, for example, usage in cellular phones, camcorders, high power toys, or several other high power electronic devices, it can be desirable to design the anode with a higher electrolyte loading (reduced zinc bulk density in the anode). The addition of tin additive to the anode composition of cells with higher electrolyte loading (reduced zinc bulk density), as in Example 4, also gives the cell better performance characteristics than the same cell (Example 3) without the tin additive as may be seen from comparison of the performance results.

Although the present invention was described with respect to specific embodiments, it should be recognized that variations are possible without departing from the concept of the invention. Thus, the invention is not intended to be limited to the specific embodiments, but rather its scope is reflected by the claims and equivalents thereof.

What is claimed:

1. An electrochemical cell comprising an anode comprising zinc, an aqueous alkaline electrolyte solution, a separator and a cathode comprising manganese dioxide, said anode further comprising tin powder comprising between about 0.2 and 3.0 percent by weight of the anode, wherein said cell comprises less than 20 parts by weight mercury per million parts cell weight, wherein said cell comprises less than 30 parts by weight lead per million parts of the metal content in the anode, wherein the bulk density of the zinc in the anode is between about 1.75 and 2.2 grams per cubic centimeter of anode volume, wherein the anode comprises a portion of said aqueous electrolyte solution in the cell and the percent by volume of the aqueous electrolyte solution in the anode is between about 69.2 and 75.5 percent by volume of the anode.

2. The cell of claim 1 wherein the lead content in the cell is less than 15 parts per million parts of total metal content in the anode.

3. The cell of claim 1 wherein the tin powder has an average particle thickness of between about 10 and 50 micron and an average particle surface area of between about 0.1 and 10 $mm^2$.

4. The cell of claim 1 wherein the cell comprises zero added lead and zero added mercury.

* * * * *